Dec. 30, 1947.  R. L. HALLOCK  2,433,607
METHOD OF INSTALLING FASTENING MEANS
Filed March 8, 1943  3 Sheets-Sheet 1
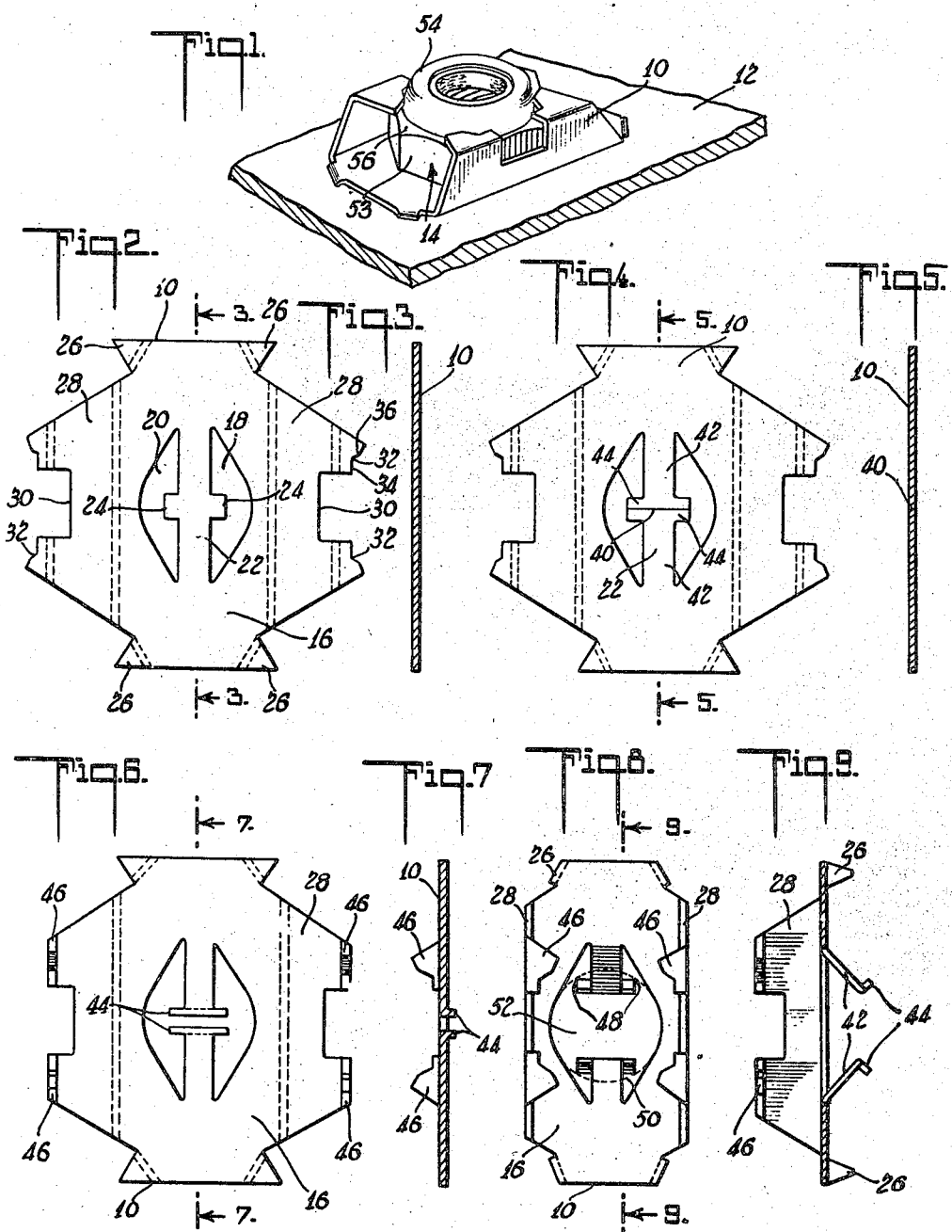
INVENTOR.
Robert Lay Hallock
BY
his ATTORNEY

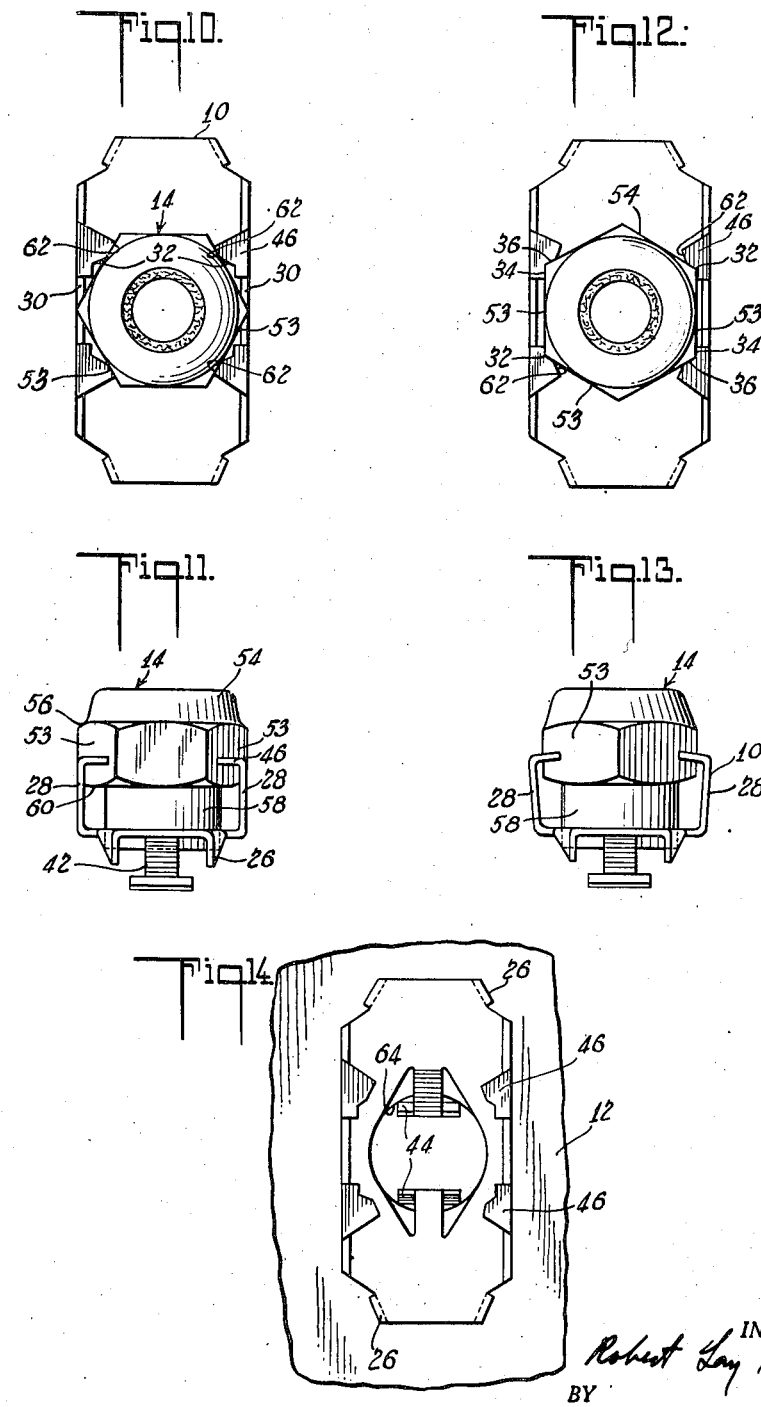

Dec. 30, 1947.  R. L. HALLOCK  2,433,607
METHOD OF INSTALLING FASTENING MEANS
Filed March 8, 1943  3 Sheets-Sheet 3
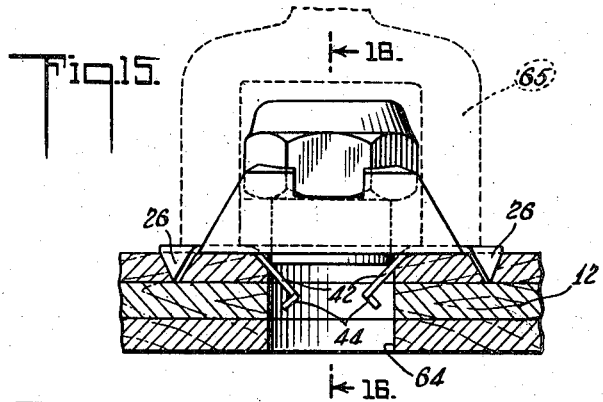
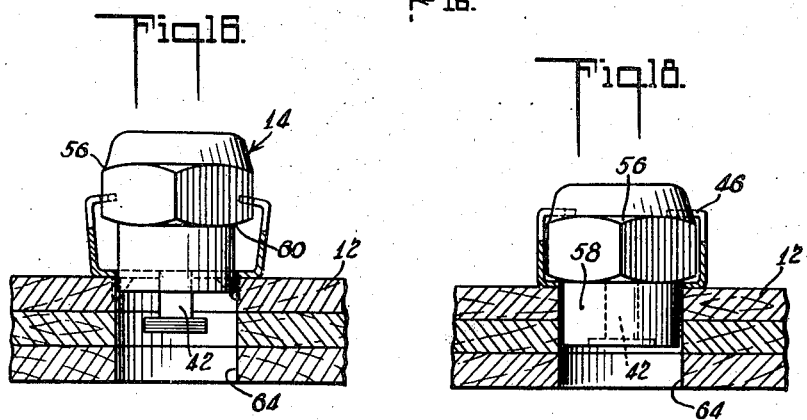
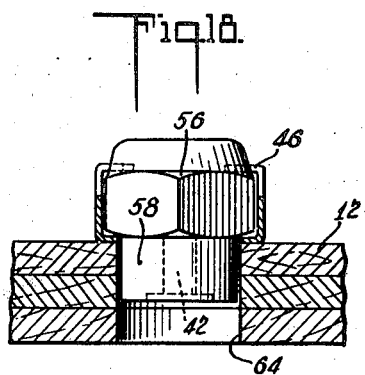
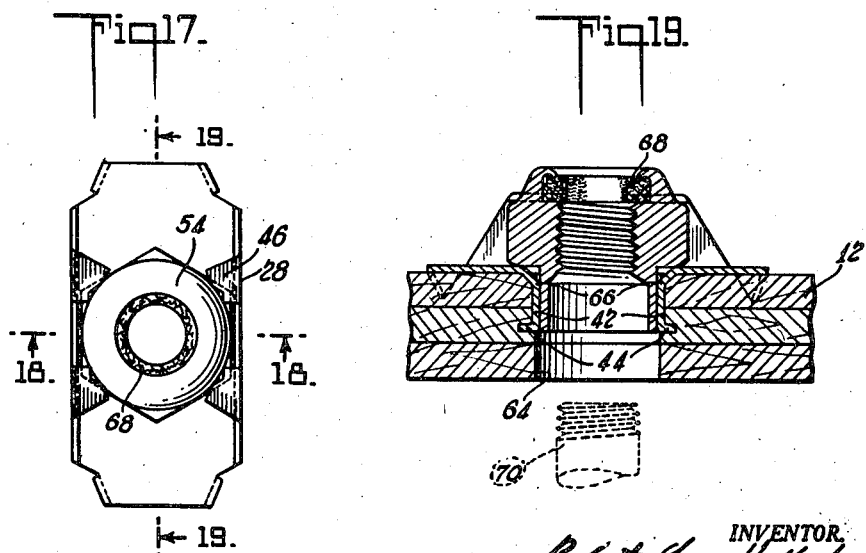
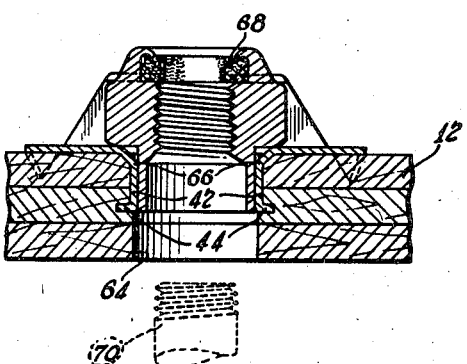
INVENTOR.
Robert Hay Hallock
BY
his ATTORNEY Patented Dec. 30, 1947

2,433,607

UNITED STATES PATENT OFFICE 2,433,607

METHOD OF INSTALLING FASTENING MEANS

Robert Lay Hallock, Larchmont, N. Y., assignor to Elastic Stop Nut Corporation of America, Union, N. J., a corporation of New Jersey Application March 8, 1943, Serial No. 478,408

3 Claims. (Cl. 29—148)

The present invention relates to the installation of fastening means and has particular reference to the installation of screw threaded fastening means of the kind in which a threaded member such as a nut is retained in secured relation to a body of relatively soft material by means of a basket member holding the threaded member and in turn penetratively engaging the softer body.

In attaching fastening elements such as nuts to members or parts which are to be joined, such elements frequently must be attached so as to provide what is commonly known as "blind mountings," that is, mountings in which the fastening elements are inaccessible for holding by a tool when the bolt or screw is threaded into it. In such cases the fastening element must be held against rotation and also against axial thrust forces and for this purpose numerous different types of nut mounting devices have been developed, which however have proved to be generally satisfactory only when the member to which the fastening element is to be held is metal, so that the holding means can be either riveted or welded thereto.

In U. S. Patent No. 2,404,372 granted July 23, 1946, on my copending application Serial No. 498,570, filed August 13, 1943, as a continuation-in-part of this application, there is disclosed and claimed a new and improved form of fastening means which includes a basket member that may be secured firmly to a body of relatively soft material and which will hold securely with relation thereto a fastening element such as a nut against all normally encountered torque and thrust stresses that may be imposed.

The general object of the invention forming the claimed subject matter of this application is the novel method whereby such a basket member may readily be installed in fixed relation to a body of softer matter, and which moreover does not require the employment of experienced or skilled labor to correctly and rapidly install the device.

Further and more detailed aspects of the invention, together with the advantages to be derived from its use, will appear more fully from the ensuing portion of this description taken in conjunction with the accompanying drawings in which:

Fig. 1 is a perspective view of an installed fastening unit embodying the invention.

Figs. 2 and 3 are plan and sectional views respectively of a stamping or blank for forming the basket member in accordance with a preferred method of manufacture.

Figs. 4 and 5 are views corresponding to Figs. 2 and 3 respectively showing the blank after a second blanking operation.

Figs. 6 and 7 are views corresponding to Figs. 2 and 3 respectively showing the blank after a first forming operation.

Figs. 8 and 9 are views corresponding to Figs. 2 and 3 respectively showing the blank after a second and final forming operation.

Figs. 10 and 11 are plan and end views respectively of a fastening unit comprising a basket member and nut, with the nut in a preliminary assembled position in the basket.

Figs. 12 and 13 are views corresponding respectively to Figs. 10 and 11 showing the nut turned in the basket to an intermediate assembled position.

Fig. 14 is a plan view showing the basket positioned over an aperture in a body to which it is to be secured.

Fig. 15 is a side view showing the unit after a preliminary setting operation.

Fig. 16 is an end view, partly in section, of the structure shown in Fig. 15.

Figs. 17 and 18 are top and end views respectively of the unit after the final setting operation, and Fig. 19 is a section taken on the line 19—19 of Fig. 17.

Fig. 1 shows in elevation and in installed position a fastening means comprising an anchoring or basket member 10 secured to a sheet 12 of ply-wood or other material softer than that of the member 10 and holding in operative position a hexagonal nut 14 through which a bolt or screw is to be threaded from below the sheet 12 through a suitable aperture therein. While in the illustrated example the nut, which will be described more in detail later, has a hexagonal body, it will be understood that this specific shape of nut is shown and described herein only by way of example and that the principles of the invention may equally well be applied to other specific shapes of nuts or equivalent fastening elements.

The basket member 10 is made from sheet metal and is formed by a series of blanking and forming operations which will now be described with reference to the production of a basket member suitable for use with a hexagonal nut of the kind shown in Fig. 1.

In the first operation member 10 is blanked out from sheet material to have the form shown in Figs. 2 and 3. In this form the blank has a central base portion 16 in the central part of which two elongated openings 18 and 20 are formed and between which there is left a bridge or web 22 from the oposite sides of which projects lugs 24. At the corners of the base portion 16 triangular points, or prongs, 26 are formed. Along the major sides of the central portion, laterally extending wings 28 are provided, each having a rectangular notch 30 located centrally at its outer edge. The material at each side of each of the notches 30 is further notched as at 32 and, as will be noted from Fig. 2, the sides 34 of notches 32 are parallel to the major axis of the member while the included angle between sides 34 and sides 36 of each notch 32 is approximately 120 degrees. The reason for this configuration will appear later.

The blank above described is then subjected to a shearing operation for transversely parting the bridge 22 along the line 40 to provide two separate legs 42, the free ends of which terminate in transversely extending feet 44. If desired in the blanking operations the blank 10 may be scored along lines indicated by the dotted lines in Figs. 2 and 4 to aid in the subsequent bending effected by the forming operations.

In the first forming operation the blank is shaped to the form shown in Figs. 6 and 7, the portions to each side of the notches 30 being bent up at right angles to the plane of the base portion of the blank to form fingers 46 while the feet 44 are bent downwardly substantially at right angles to the plane of the base as shown more clearly in Fig. 7.

In a succeeding forming operation the wings 28 are bent upwardly to positions substantially at right angles to the base portion, as shown in Figs. 8 and 9, thus bringing fingers 46 into opposed confronting relation with the notches 32 facing each other, the wings with their associated fingers providing what may be termed re-entrant confronting arms. In the same operation the prongs 26 are bent downwardly at right angles to the plane of the base and the legs 42 are also bent downwardly but only to an inclined position as shown more clearly in Fig. 9. The legs 42 with their feet 44 provide what may be termed hooks and for reasons which will hereinafter more fully appear these portions preferably are bent downwardly to positions such that the outer corners 48 of the feet 42 are tangent to a circle indicated by the dotted line 50 which coincides with the curved outer walls of the openings 18 and 20 which have now been merged to provide a central aperture 52.

The basket member in the form shown in Figs. 8 and 9 is ready for assembly with the fastening element with which it is to cooperate, which in the present instance is the hexagonal nut 14 which as shown in Figs. 10 and 11 comprises a main hexagonal body portion having the wrench engaging faces or flats 53 and a circular upper portion or rim 54, these two portions being joined by a chamfered face 56. An annular skirt 58 depends around the bore of the nut from the base face 60.

In order to effect preliminary assembly of the nut and basket member the nut is first placed in the basket in the position shown in Figs. 10 and 11. In this position two diametrically opposed edges of the hexagonal portion of the nut project into the recesses 30 in the arms of the basket member and the adjacent flats 53 bear against faces 62 formed on fingers 46 adjacent to the notches 32. As will be observed from Fig. 10 the diametrically opposed edges of the nut overlie the recesses 30 so that the extent to which the nut can be pushed downwardly into the basket is limited by abutment of base 60 of the nut against the bottom of these recesses. The length of the flange 58 is made such that when the nut is pushed downwardly as far as it will go when in the position relative to the basket member shown in Fig. 10, the flange will project through the central aperture 52 in the base portion, as will be seen in Fig. 11, but will not project sufficiently to further bend outwardly the depending legs 42. In the position of the parts shown in Figs. 10 and 11 the nut will be properly centered in the basket but may be in this position with a relatively loose fit, although if desired there may be some measure of frictional contact between the sides of the nut and the fingers. It is to be noted that in this position of the parts the arms 28 are substantially unflexed.

The position of the parts shown in Figs. 10 and 11 is what may be termed a preliminary assembling position from which the nut is moved to an intermediate position of assembly which operates to make of the two parts a single unit frictionally held together with sufficient force to constitute a unitary structure for handling and shipping purposes but still requiring further change of position of the parts relative to each other to a final assembled position when the unit is installed. As will be seen from Fig. 11 the position of the nut in the preliminary assembled position is such that portions of the flats extend above the fingers 46 and with the nut in this position the flats are engaged by a wrench or any other suitable tool and turned relative to the basket to the position shown in Figs. 12 and 13. In this position, edges between adjacent flats 53 are forced into the notches 32 of the fingers 46 and portions of the flats are engaged by the sides 34 and 36 of the notches. It will be apparent from a consideration of Figs. 10 and 12 that for this to be effected the arms 28 will have to be sprung outwardly as shown in Fig. 13, this being accomplished by what amounts to cam action by the flats of the nut when the latter is turned. As previously noted, the angle between the sides 34 and 36 of the notches is 120 degrees so that for a hexagonal nut the sides of the notches will solidly engage the flats. Obviously, if the portion of the nut to be gripped is of different configuration, the notches in the fingers 36 should be shaped accordingly.

With the parts in the position relative to each other shown in Figs. 12 and 13, the nut is tightly gripped frictionally by the flexed arms 28, and due to the fact that the notches in the fingers engage the different faces of the nut and the fact that the skirt or shank 58 of the nut is located in the central aperture 52 of the base portion of the basket, the nut is evidently securely held in the basket not only against removal therefrom in ordinary handling but also against "cocking" in the basket. At the same time the assembly is not of a permanent nature to the extent that either one of the parts needs to be permanently deformed in order to effect disassembly, so that if, for example, it were found after assembly of a unit that either one of the parts were defective the two parts could readily be separated and the good part reassembled with a part replacing the defective one.

The unit as above described is ready for attachment to an apertured body of ply-wood or other material softer than the metal of the basket such as the sheet 12 which, as indicated in Fig. 15, is provided with an aperture 64 the diameter of which is preferably substantially the same, but with a slight clearance, as the diameter of the skirt 58 of the nut. In securing the unit to the sheet, the basket is placed over the aperture with the legs 42 projecting into the aperture and from Fig. 14 the utility of bending these legs downwardly to a position such that the corners of the feet 44 assume a predetermined position relative to the basket will be apparent. From this figure it will be seen that with the feet positioned as described they will act as centering members for exactly centering the basket over the aperture in the sheet before the prongs 26 make contact with the surface of the sheet. After the basket has been placed over the aperture and centered by means of the feet it is then preliminarily fixed to the surfaces of the sheet by a blow which operates to embed the prongs 26 in the material of the sheet as shown in Figs. 15 and 16. This may be accomplished with any suitable form of forked tool such as that indicated by dotted lines 65 in Fig. 15 which will bridge the nut and bear against the exposed end portions of the central base of the basket.

With the basket seated flush against the surface of the sheet, the final installing operation, which operates to lock the basket to the sheet and which also operates to move the parts of the unit to finally assembled and substantially locked position, is effected by a blow on the top of the nut which will operate to force the nut downwardly into the basket until the base face 60 seats against the central base portion of the basket. This movement effects two things simultaneously. When the nut is moved from the position shown in Fig. 16 to the position shown in Fig. 18 the flange 58 of the nut acts to embed the hooks formed by the legs 42 and feet 44 into the side wall of the aperture 64, thus locking the basket against removal axially from the sheet unless the hooks are torn forcibly through the material of the sheet. At the same time the downward movement of the nut moves the chamfer 56 to a position below the level of fingers 46 and these fingers snap over this chamfer to engage the circular portion 54 of the nut as shown in Figs. 17 and 18. As will be more clearly seen from Fig. 17 the fingers in moving to this position move so as to overlie the hexagonal portion of the body of the nut and hold it against axial displacement from the basket under the influence of any normal force likely to be exerted against the nut in a direction tending to force it out of the basket. The flats, lying between the wings 28, serve to prevent rotation of the nut in the basket.

As will be observed from Fig. 19, the legs 42 are bent on a substantial radius as indicated at 66 and it is in order to effect this that the openings 18 and 20 shown in Fig. 2 are made elongated rather than half-circular in form so that the legs will be initially bent from a position outside the radius of the circle 50 (Fig. 8). By bending these legs on an appreciable radius, any tendency of the base portion of the basket to distort or bulge is avoided and a further embedding of the hooks in the side wall of the aperture 64 is effected.

In the device illustrated the nut shown is of a known self-locking type in which a locking insert 68 of fibre or other elastic material is carried in the nut body for engagement with the threads of a bolt or screw threaded through the nut from the underside of the sheet 12. In any such installation the normal forces acting on the unit will be axially downward as viewed in Fig. 19 and the substantial area of the base portion of the basket affords means for distributing the load over an appreciable area of the surface of the sheet 12, thus minimizing the possibility of pulling the unit through the sheet even if the latter is of relatively weak material. The unit will also be subject to certain torque forces and effective resistance to these forces is effected, even though the material of the sheet is relatively soft, by means of the prongs 26 which are located at a substantial radius from the axis of the nut. These prongs or their equivalent are not in all cases essential, however, since the extent to which the hooks are embedded in the wall of the aperture 64 is considerable and if the material of the sheet has any great degree of density and strength the hooks themselves may well be ample to keep the unit from turning under the influence of any torque likely to be applied to it in normal service.

While in its finally installed position the unit constitutes a substantially locked assembly, it is possible to remove the nut from the basket for replacement without injury to the basket. Such removal can be effected by a combination of torque and axial thrust applied to the nut upwardly and away from the basket, as for example, by a threaded bolt such as is indicated at 70. If this bolt is screwed upwardly into the nut until the end of the thread is reached and is then simultaneously twisted and forced upwardly the cam action of the flats of the nut plus the axial force exerted on the under sides of the gripping fingers can be made to force the resilient arms 28 outwardly to permit the nut to assume its position of preliminary assembled relation to the basket as shown in Figs. 10 and 11. From this position the nut can readily be withdrawn from the basket. Likewise the nut can be removed by a similar combination of torque and axial force by screwing a bolt into the nut from the top to a point where the thread end is reached so that torque and axial pull from above can be applied to the nut. Replacement of a removed nut from an installed basket is effected in the same way as previously described in connection with the assembly of an uninstalled unit. While the unit might be removed by a strong axially applied force alone, as by a blow, this is not desirable since without the cam action on the arms produced by torque and tending to spread them, the fingers might be permanently deformed by the nut.

What is claimed:

1. The method of attaching to a body of relatively soft material a basket member having a base portion, prongs extending downwardly from said base portion and adapted to penetrate the surface of said body and hook portions extending downwardly from said base portion and adapted to be inserted in an opening in said body, which comprises placing said member on said surface with said prongs bearing on said surface with said hooks inserted in said opening, impacting said member to cause said prongs to penetratively engage the surface of said body and bring said base portion into contact with said surface and thereafter spreading said hook portions to cause them to engage said body.

2. The method of attaching to a body of relatively soft material a basket member having a base portion, prongs extending downwardly from said base portion and adapted to penetrate the surface of said body and hook portions extending downwardly from said base portion and adapted to be inserted in an opening in said body, which comprises placing said member on said surface with said prongs bearing on said surface with said hooks inserted in said opening, impacting said member to cause said prongs to penetratively engage the surface of said body and bring said base portion into contact with said surface and thereafter driving said hook portions into the wall of said opening by forcing said hook portions laterally away from each other.

3. The method of attaching to a body of relatively soft material a fastening unit consisting of a basket member having a base portion, prongs extending downwardly from said base portion and adapted to penetrate the surface of said body and hook portions extending downwardly from said base portion and adapted to be inserted in an opening in said body and a nut relatively movable in said member and having a part adapted to engage a portion of said member to cause said prong portions to be spread upon relative movement of the nut with respect to said member after such engagement, which includes the steps of placing said member on said body with said prongs bearing on said surface with said hook portions in said opening, impacting said member to cause said prongs to penetratively engage the surface of said body and bring said base portion into contact with said surface, and thereafter impacting said nut to move it relative to said basket and to cause said hook portions to be spread into engagement with said body.

ROBERT LAY HALLOCK.

REFERENCES CITED

The following references are of record in the file of this patent:

UNITED STATES PATENTS

| Number | Name | Date |
|---|---|---|
| 2,020,348 | Beble | Nov. 12, 1935 |
| 2,230,916 | Tinnerman | Feb. 4, 1941 |
| 2,292,421 | Wolf | Aug. 11, 1942 |
| 1,114,135 | Hafertep | Oct. 20, 1914 |
| 2,006,281 | Schwarz | June 25, 1935 |
| 1,225,612 | Gawley | May 8, 1917 |
| 2,149,564 | Waters | Mar. 7, 1939 |
| 2,272,355 | Schnell | Feb. 10, 1942 |
| 1,720,318 | Chisholm | July 9, 1929 |
| 1,753,791 | Kiesel | Apr. 8, 1930 |
| 1,761,358 | Mitchel | June 3, 1930 |
| 1,768,505 | Carr | June 24, 1930 |
| 2,026,757 | Swanstrom | Jan. 7, 1936 |
| 2,303,148 | Tinnerman | Nov. 24, 1942 |
| 2,094,984 | Hiering | Oct. 5, 1937 |